United States Patent [19]

Hanns et al.

[11] Patent Number: 5,490,571
[45] Date of Patent: Feb. 13, 1996

[54] SUB-ASSEMBLY FOR DUST SUPPRESSION IN ROCK DRILLING

[75] Inventors: David T. Hanns, 2 Brooks Parade, Belmont, New South Wales, Australia, 2280; Christopher R. Carrall, 12 Mitchell Road, Cardiff, New South Wales, Australia, 2285

[73] Assignees: Christopher Richard Carrall, Cardiff; David Thomas Hanns; Jo-Ann Nicol, both of Belmont, all of Australia

[21] Appl. No.: 313,266

[22] PCT Filed: Apr. 1, 1993

[86] PCT No.: PCT/AU93/00141

§ 371 Date: Jan. 25, 1995

§ 102(e) Date: Jan. 25, 1995

[87] PCT Pub. No.: WO93/20331

PCT Pub. Date: Oct. 14, 1993

[30] Foreign Application Priority Data

Apr. 1, 1992 [AU] Australia ................. PL1648

[51] Int. Cl.$^6$ .................. E21B 17/18; E21B 17/22; E21B 21/14; E21C 7/08
[52] U.S. Cl. ................. 175/323; 175/69; 175/71
[58] Field of Search ................. 175/323, 69, 68, 175/71, 215, 207, 212

[56] References Cited

U.S. PATENT DOCUMENTS

| | | | |
|---|---|---|---|
| 3,094,175 | 6/1963 | Jackson | 175/71 X |
| 3,716,108 | 2/1973 | Loftis et al. | 175/212 X |
| 4,515,229 | 5/1985 | Drummond et al. | 175/337 |
| 5,139,095 | 8/1992 | Lyon et al. | 175/69 |

FOREIGN PATENT DOCUMENTS 146433  5/1950  Australia .

OTHER PUBLICATIONS

SU,A,1265311 (MAGN MINE METAL INS) 23 Oct. 1986 Derwent Abstract N87 121381 (PAN 87-161911/23).
SU,A, 866167 (MOSCOW MINING INST) 23 Sep. 1981 Derwent Abstract, J4572E/28 (Bulletin 35/23 Sep. 1981).

*Primary Examiner*—Stephen J. Novosad
*Attorney, Agent, or Firm*—Dressler, Goldsmith, Shore & Milnamow, Ltd.

[57] ABSTRACT

This invention concerns an accessory, to be inserted in a drill string behind a drill bit, to provide separation of the liquid and air components of a flushing medium. The accessory comprises an inner housing (36) within an outer housing (34). A liquid/gas medium enters through opening (50) onto spiral raceway (48). Holes are provided at intervals along spiral (42). Liquid in the medium is centrifuged by the spiral (42) and projected into the chamber between inner and outer housings (36,34). The expelled liquid (52) falls to the base (70) of the housing (34) where it passes through apertures (38) into the drill bore. Once the medium has traversed the spiral (42) essentially only gas remains to pass through the opening (62) to the drill bit.

8 Claims, 2 Drawing Sheets

SUB-ASSEMBLY FOR DUST SUPPRESSION IN ROCK DRILLING

TECHNICAL FIELD

The present invention relates to dust suppression in rock drilling operations and in particular to a subassembly to separate the liquid from the gas of the flushing medium used in rock drills.

Drilling into bedrock for example to enable explosive charges to be placed for excavating ore in open-cut mining operations is carried out by rotary air blast drills. Air at high pressure (typically 40 psi) and volume (750 to 2000 cubic feet a minute (cfm)) is delivered through a bore in the drill string to the drill bit. The air supplied to the drill bit, which may for example be a blade or roller type bit, exits from orifices in the bit, cools the bearings of the bit and conveys the debris created by the drilling away from the drilling workface up the borehole. This debris travels up the borehole at a typical (bailing) velocity of 5,000 to 7,000 feet per minute depending on the size of the borehole and the drill string.

BACKGROUND OF THE INVENTION

The debris produced includes particulate matter and dust. To reduce the dispersion of dust into the environment, which has deleterious effects on both equipment and personnel, the debris is sprayed with water. The water is supplied with the air through the drill string to the drill bit and in addition to suppressing dust also causes corrosion, in particular of the bearings. It also produces a slurry which causes wear of the cutting surfaces of the drill bit, reducing the life of the bit and reducing drill penetration rates. The drill bit is a costly item to replace.

A stabiliser may be located behind the drill bit to centre the drill bit within the borehole. The sections of the drill string are joined together by threaded connectors at either end. Two standard threads are generally used in the drilling industry, namely BECO and API, and a crossover connection is often required to accommodate assemblies having these different threads.

DISCLOSURE OF THE INVENTION

According to a first aspect of the invention, there is provided a dust suppression sub-assembly for a rock drill. The sub-assembly is provided with means to secure it into a drill string adjacent the drill bit. The subassembly includes an outer housing and an inner housing, and a helical path extends through the inner housing. Inlet means for a gas and liquid flushing medium are provided at one end of the sub-assembly communicating with the helical path. A plurality of slots are spaced at intervals along the inner housing communicating between the interior of the inner housing and a chamber defined between the inner and outer housings. The liquid part of the flushing medium is centrifuged by its helical motion along the path and exits the slots. A plurality of outlets are provided for the liquid in the outer housing adjacent the other end of the sub-assembly, and exit means are provided for the gas at the other end of the inner housing in communication with the helical path.

The sub-assembly can be fitted behind the drill bit or behind the stabiliser of the drill string of a rock drill. The sub-assembly is attached at either end by hollow threaded connections; the connections may be either male or female.

Preferably, the helical path is formed by a spiral flange. Alternatively the helical path is formed by a plurality of entwined tubes.

Preferably the slots are 180° apart along the helical path.

Preferably the inner and outer housings are co-axial cylinders of different radii.

Preferably scrapers are provided on the interior of the inner housing at the trailing edges of the slots, in the direction of motion of the medium along the spiral path, to direct the liquid radially outwards through the slots. Optionally the scrapers comprise curved extensions of the trailing edges of the slots.

Preferably the sub-assembly further comprises a return path extending between a balance hole adjacent the other end of the sub-assembly, and provided with a one-way check valve; and a return port adjacent the inlet means.

BRIEF DESCRIPTION OF THE DRAWINGS

A preferred embodiment of the invention will now be described with respect to the following figures in which.

BEST MODE FOR CARRYING OUT THE INVENTION

Figure 1:
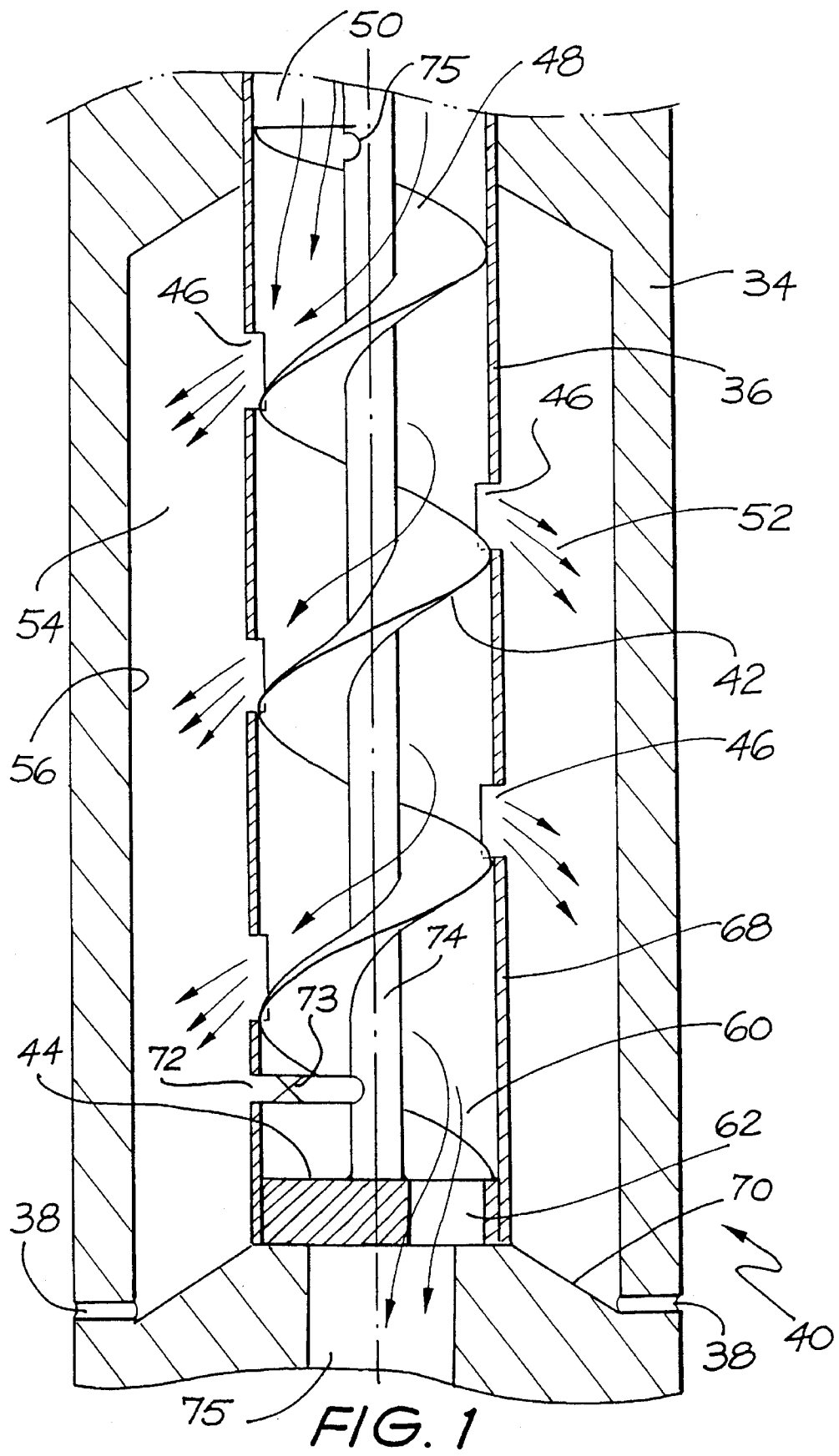
FIG. 1 is a partial longitudinal section of an embodiment of the invention.

The sub-assembly comprises an outer housing 34 and an inner housing 36. The inner housing 36 is coaxial with the outer housing 34 and of lesser radius.

Around the periphery of the outer housing 34 and towards that end 40 which will be located in use nearest the drill bit are a series of holes 38.

The inner housing 36 has a tight-fitting internal spiral flange 42 extending along its length and terminating at its lower end in a base 44. The inner housing 36 has slots 46 in its wall located 180° apart along the length of the spiral 42, and located adjacent the spiral 42.

Water and air enter at the top 48 of the spiral, through opening 50 from the drill string, and flow along the spiral 42. The water, as shown by arrows 52, is forced radially outwards by the centrifugal action of its motion along the spiral, and exits through the slots 46 into the chamber 54 between the inner housing 36 and the inner wall 56 of the outer housing 34. The water is progressively removed from the medium as it progresses along the spiral 42.

Figure 2:
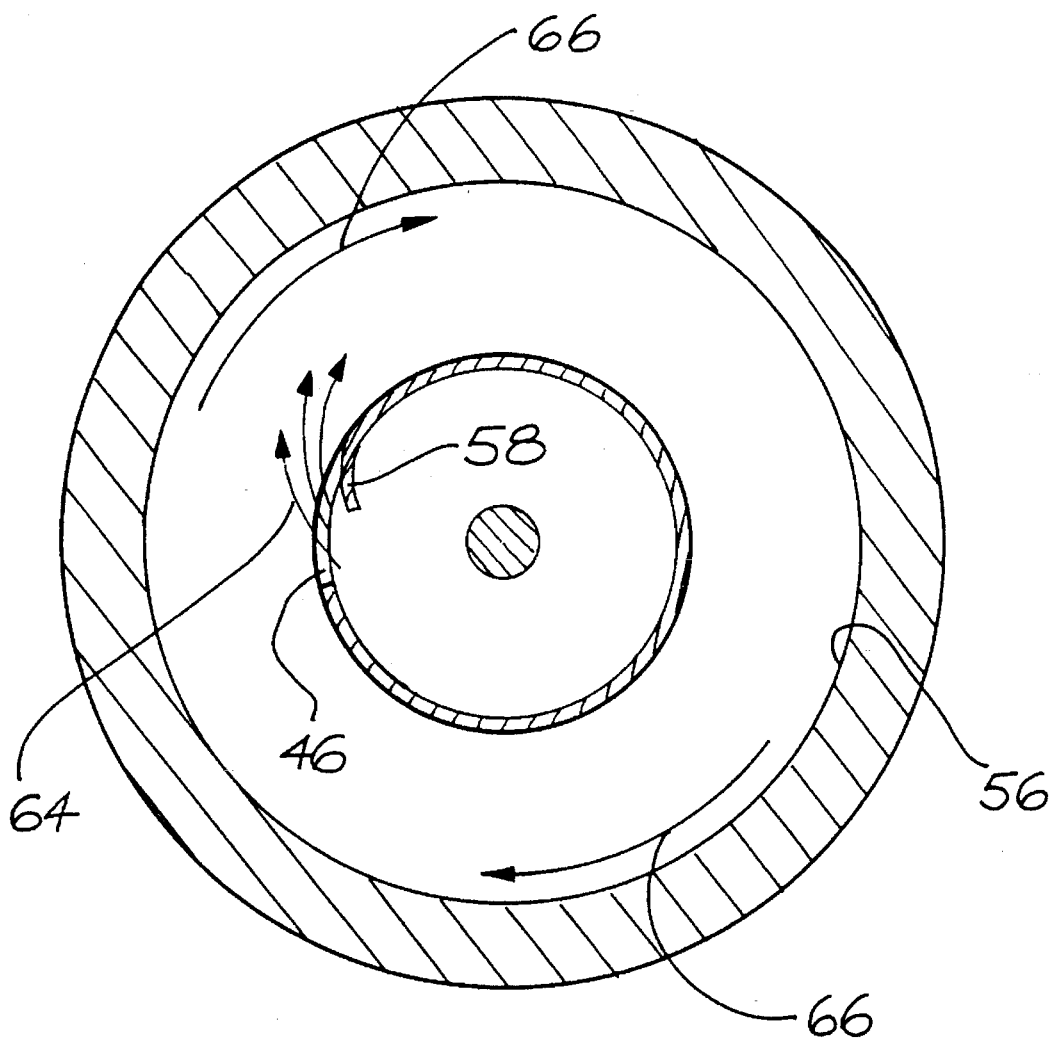
FIG. 2 is a schematic cross section of the embodiment of FIG. 1.

The edges of slots 46 are shaped (see FIG. 2) with the trailing edges 58, in the direction of motion of the water 52, curved inwards to act as deflectors, or scrapers, to scrape the water from the inner walls of inner housing 36; they direct the water 52 radially outwards.

Substantially only air 60 exits the inner housing 36 through the aperture 62 in the base 44 of spiral 42, and continues down into a base 75 in the drill string to the bit.

The water 52 exiting 64 from the slots 46 continues to move outwards under the effect of centrifugal forces, which results in a further separation of the water and any entrained air.

The water gathers 66 at the inner surface 56 of the outer housing 34, and the air gathers towards the outer surface 68 of the inner housing 36. The water separated by this action travels down the inner wall 56 of the outer housing 34 to exit from the assembly through holes 38 at the bases of taper boss 70. These holes 38 allow water to spray the debris forced up the borehole by pressurised air exiting from the drill bit in a manner to be described more fully below. The pressure in the space between the inner and outer housing is positive with respect to the outside of the outer housing (the borehole) to drive the water through the holes 38. The size and number of holes 38 depends on the volume of water to be dispersed and on the desire to avoid excessive pressure loss.

The air gathered near the outer wall 68 of the inner housing 36 can re-enter the inner housing 36 through slots 46.

A balance hole 72 is provided near the base of the inner housing 36. The balance hole 72 leads into the central pillar 74 of the spiral via a one way check valve 73. Excess water and air are returned through central pillar 74 to a return port 75 adjacent the top 48 of the spiral.

The debris created by the action of the drill bit is driven upward from the drill bit up the borehole by the air and upon reaching the region of the holes 38 in the outer housing 34 becomes wet, the air then carries the resultant slurry further up the borehole.

Little air remains in the water 52 compared to that which was initially fed in at the top 48 of the spiral.

Accordingly, essentially dry air (90% to 98% air) is delivered to the drill bit. The region of the drill bit is therefore subject to the blast of air only, rather than to the generation of a thick slurry of water, air and debris which rapidly wears the drill bit, and its bearings. The substantial absence of water from the drill bit reduces water corrosion of the bearings.

The sub-assembly can be connected to the drill bit or to the stabiliser, which is generally employed to centre the drill bit in the borehole. It could comprise a separate sub-assembly or could be built into the stabiliser. More than one unit may be employed to produce the required separation of the water from the flushing medium.

Although the invention has been described with reference to a particular embodiment it should be appreciated that it may be embodied in many other ways. For instance, the number of turns and pitch of the spiral 42 and the number of slots 46 will depend on the volume of water and air passing through the drill string. The size of the drill string and hence of the housings 34, 36 will depend on the application. It is preferred that the cross sectional area of the spiral 42 is greater than that of the inlet 50 to reduce any adverse effects that may be created by back pressure developing in the inlet.

It is understood that turbulence in the flow is to be avoided to allow easier separation of the water by the scraping action of the slots 46. If the flow is not substantially laminar then extra turns of the spiral 42 may be required or sub-assemblies in tandem may be employed.

In an alternative embodiment the inner housing and spiral flange may be replaaced by a number of tubes entwined like braid or rope into a helix. Holes at intervals along each of the tubes allow water to escape under the centrifugal action of its circulation through the tubes in a similar manner to that described above. The outer housing would be as described for the above embodiment.

We claim:

1. A dust suppression sub-assembly for a rock drill comprising:

means to secure the sub-assembly into a drill string;

an outer housing and an inner housing;

a helical path extending through the interior of the inner housing;

inlet means for a gas and liquid flushing medium at one end of the sub-assembly, communicating with the helical path;

a plurality of slots at intervals along the inner housing communicating between the interior of the inner housing and a chamber defined between the inner and outer housings;

a plurality of outlets for the liquid in the outer housing adjacent the other end of the sub-assembly; and exit means for the gas at the other end of the inner housing communicating with the helical path.

2. A dust suppression sub-assembly according to claim 1 wherein the helical path is formed by a spiral flange.

3. A dust suppression sub-assembly according to claim 1 wherein the helical path is formed by a plurality of entwined tubes.

4. A dust suppression sub-assembly according to claim 1 wherein the slots are 180° apart along the helical path.

5. A dust suppression sub-assembly according to claim 1 wherein the inner and outer housings are co-axial cylinders of different radii.

6. A dust suppression sub-assembly according to claim 1 wherein scrapers are provided on the interior of the inner housing at the trailing edges of the slots, in the direction of motion of the medium along the spiral path, to direct the liquid radially outwards through the slots.

7. A dust suppression sub-assembly according to claim 6 wherein the scrapers comprise curved extensions of the trailing edges of the slots.

8. A dust suppression sub-assembly according to claim 1, further including a return path extending between a balance hole adjacent the other end of the sub-assembly, and provided with a one-way check valve, and a return port adjacent the inlet means.

* * * * *